United States Patent
Knechtges

(10) Patent No.: US 8,419,138 B2
(45) Date of Patent: Apr. 16, 2013

(54) TECHNOLOGY FOR THE ELECTRONIC BRAKE FORCE DISTRIBUTION IN A VEHICLE BRAKE SYSTEM EQUIPPED WITH A HYDRAULIC BRAKE SERVO

(75) Inventor: Josef Knechtges, Mayen (DE)

(73) Assignee: Lucas Automotive GmbH, Koblenz (DE)

( * ) Notice: Subject to any disclaimer, the term of this patent is extended or adjusted under 35 U.S.C. 154(b) by 278 days.

(21) Appl. No.: 12/918,661

(22) PCT Filed: Feb. 16, 2009

(86) PCT No.: PCT/EP2009/001059
§ 371 (c)(1),
(2), (4) Date: Oct. 25, 2010

(87) PCT Pub. No.: WO2009/103468
PCT Pub. Date: Aug. 27, 2009

(65) Prior Publication Data
US 2011/0037310 A1    Feb. 17, 2011

(30) Foreign Application Priority Data
Feb. 22, 2008  (DE) .......................... 10 2008 010 704

(51) Int. Cl.
*B60T 8/26*    (2006.01)
(52) U.S. Cl.
USPC ......... 303/9.62; 303/11; 303/186; 303/113.5; 303/116.1; 303/119.1; 303/DIG. 6
(58) Field of Classification Search ................. 303/3, 4, 303/9.62, 9.66, 9.71, 9.73, 10, 12, 186, 187, 303/303/188, 113.5, 114.1, 114.3, 119.1, 303/20, 113.1, 116.1, DIG. 6
See application file for complete search history.

(56) References Cited

U.S. PATENT DOCUMENTS

| | | | |
|---|---|---|---|
| 4,966,420 A | 10/1990 | Schiel et al. | |
| 5,484,193 A | 1/1996 | Fuller et al. | |
| 5,547,264 A * | 8/1996 | Tozu et al. ................... | 303/9.62 |
| 5,727,852 A | 3/1998 | Pueschel et al. | |
| 5,887,957 A * | 3/1999 | Buttner et al. ............... | 303/186 |
| 6,345,869 B1 * | 2/2002 | Matsuo et al. ............. | 303/116.1 |
| 7,040,721 B2 | 5/2006 | Weiberle et al. | |

FOREIGN PATENT DOCUMENTS

| | | |
|---|---|---|
| DE | 4309243 A1 | 9/1994 |
| DE | 4439890 A1 | 5/1996 |
| DE | 19626926 A1 | 1/1998 |
| DE | 10319663 A1 | 11/2004 |
| EP | 0343365 A2 | 11/1989 |
| EP | 1 155 933 A2 | 11/2001 |
| EP | 1477379 A1 | 11/2004 |
| GB | 2207206 A | 1/1989 |
| GB | 2207720 A | 2/1989 |
| WO | 02070312 A1 | 9/2002 |

* cited by examiner

*Primary Examiner* — Thomas J Williams
(74) *Attorney, Agent, or Firm* — MacMillan, Sobanski & Todd, LLC

(57) ABSTRACT

The invention relates to a technology for effecting electronic brake force distribution in a vehicle brake system, which is equipped with a hydraulic brake boosting, comprising detecting a state requiring an electronic brake boosting and a limiting of the brake pressure generation of the hydraulic brake boosting according to the electronic brake boosting.

12 Claims, 4 Drawing Sheets

TECHNOLOGY FOR THE ELECTRONIC BRAKE FORCE DISTRIBUTION IN A VEHICLE BRAKE SYSTEM EQUIPPED WITH A HYDRAULIC BRAKE SERVO

CROSS-REFERENCE TO RELATED APPLICATIONS

This application is a national stage of International Application No. PCT/EP2009/001059 filed Feb. 16, 2009, the disclosures of which are incorporated herein by reference, and which claimed priority to German Patent Application No. 10 2008 010 704.2 filed Feb. 22, 2008, the disclosures of which are incorporated herein by reference.

BACKGROUND OF THE INVENTION

The invention relates to a vehicle brake system. In particular, the invention relates to a coordination of the functions of hydraulic brake boosting and electronic brake force distribution.

Vehicles that have brake systems actuated hydraulically or electrohydraulically conventionally comprise a plurality of mutually independent brake circuits. The use of a plurality of mutually independent brake circuits serves the purpose of redundancy, so that it is still possible to brake the vehicle even if one of the brake circuits should be unable to function. Furthermore, a braking response of the vehicle may be influenced in that during a braking operation the brake circuits are actuated differently. Especially in the case of heavy cars and lorries it is customary to provide one brake circuit for a front axle and another brake circuit for a rear axle. Such a brake circuit split is also known as a "black-and-white split" or "front/rear split brake circuit".

In many motor vehicles actuation of the brake system is made easier for the driver by means of brake force boosting. In this case, the force generated by the driver by means of an actuation of the brake pedal is transmitted to a master cylinder and additionally increased by a specific factor by means of a brake booster. This assistance makes it easier for the driver to achieve a high brake pressure and hence a high deceleration effect, while as a result of the direct introduction of the hydraulic pressure generated by the driver into the brake circuit a braking of the motor vehicle itself remains possible even in the event of failure of the brake boosting.

The additional force needed to boost the brake force summoned up by the driver is drawn for example by a vacuum brake booster from a vacuum that is conventionally generated by a drive motor of the motor vehicle in a vacuum accumulator. In this case, there are a number of situations, in which such a brake booster is not, or is insufficiently available to assist a braking operation to a required extent. For example, the vacuum accumulator gradually empties while the drive motor is not running. After starting of the drive motor the vacuum accumulator therefore first has to be re-evacuated, which takes a specific time, during which the capacity of the brake booster is not fully deployable. In another example, the motor vehicle is exposed to a low external air pressure, for example at high altitude, so that a boosting effect of the vacuum brake booster because of the slight difference between the vacuum and the air pressure acting from outside may likewise be lower than that requested by the driver.

In order to bridge such situations of insufficient brake boosting, in the background art it is known to provide a hydraulic pump that is designed, where necessary, to generate an assisting hydraulic pressure in a brake circuit (hydraulic brake boost, HBB). A correspondingly powerful design of the hydraulic pump additionally allows the vacuum brake booster to be of smaller dimensions, thereby leading to reduced costs.

If the driver of a vehicle requests a very high brake pressure, then because of the dynamic axle-load distribution of the vehicle during braking a braking effect that may be generated via the front axle is greater than that of a rear axle. Wheels of the rear axle therefore tend to have a higher wheel slip than wheels of the front axle. An undesirable reduction of the directional stability of the vehicle that results from an excessive wheel slip at wheels of the rear axle may be counteracted by an electronic brake force distribution (EBD) becoming active at the rear axle. The EBD reduces the brake pressure of the rear axle brakes by means of an actuation of suitable valves in the rear-axle brake circuit, with the result that the wheel slip at the rear axle is limited.

In certain operating situations the hydraulic brake boosting attempts to increase a brake pressure in a rear axle brake, while the electronic brake force distribution however does not allow the brake pressure generated by the hydraulic pump to reach the brakes. As a result, the HBB system and the EBD system work against one another in these situations.

The underlying problem of the invention is therefore to indicate a method of operating a brake system that avoids the previously described drawbacks.

BRIEF SUMMARY OF THE INVENTION

According to a first aspect, a method of effecting electronic brake distribution in a vehicle brake system equipped with hydraulic brake boosting, wherein the hydraulic brake boosting is designed to assist the build-up of a brake pressure requested by a driver, comprises the steps of detecting a state requiring an electronic brake force distribution and of limiting the brake pressure generation of the hydraulic brake boosting in accordance with the electronic brake force distribution. The limiting of the brake pressure generation may comprise the build-up of the brake pressure up to at most a limit value or alternatively the lowering of a brake pressure down to or below the limit value.

The hydraulic brake boosting may be effected by means of an HBB system and the electronic brake force distribution may be effected by means of an EBD system. The detecting of a driving- or vehicle state that requires an electronic brake force distribution may comprise determining at least one of the following variables: a laden state, an inclination in a longitudinal or transverse direction, a yaw rate, a wheel slip at a rear axle, a wheel slip at a front axle, a vehicle velocity, a rotational speed of a wheel, and an angle of rotation of a steering wheel of the vehicle.

The hydraulic brake boosting may comprise electrical actuation of a hydraulic pump that is integrated into the vehicle brake system. In particular, the limiting of the brake pressure build-up may be effected by electrical actuation of the hydraulic pump.

In an embodiment, the hydraulic pump is driven by an electric motor and an electric power consumed by the electric motor is adjusted in a suitable manner. This may be effected for example by influencing an electric current consumed by the electric motor, a voltage across the electric motor and/or a pulse/pause ratio of pulse width modulation that controls the electric motor. In another embodiment, in the course of actuation a delivery response of the hydraulic pump may be influenced by means of a final controlling element, for example by electrically influencing the transmission response of a force-transmitting device between a drive and the hydraulic pump.

This control may be effected likewise by means of influencing a current, a voltage and/or a pulse/pause ratio of pulse width modulation.

The electrical actuation of the hydraulic pump for the hydraulic brake boosting may be effected upon attainment or upon immediately impending attainment of a maximum gain of a brake booster that is integrated into the vehicle brake system. The brake booster may be a vacuum brake booster or a pneumatic brake booster. The maximum gain indicates the operating state of a brake booster, in which the maximum boosting effect is achieved. The maximum gain may vary as a function of various parameters (for example the maximum vacuum that may just be generated).

The hydraulic brake boosting may comprise an electrical actuation of a valve that hydraulically separates a high-pressure side of the hydraulic pump from a driver-operated master cylinder. The actuation may be effected for example in such a way that a brake pressure generated by the hydraulic pump is not diverted into the master cylinder (and optionally from there into a hydraulic fluid reservoir). A second valve may be hydraulically connected in parallel to the valve, wherein the second valve exercises a pressure-limiting function. This means that the second valve opens automatically as soon as a preset pressure difference at its two ports is exceeded. With the aid of such a pressure-limiting valve, damage as a result of overloading of parts of the brake system may be avoided.

The hydraulic brake boosting may further comprise electrical actuation of a valve that hydraulically connects a low-pressure side of the hydraulic pump to a driver-operable master cylinder. As a master cylinder is conventionally connected to a hydraulic fluid reservoir, it is possible in this way to ensure for example that the hydraulic pump may take in sufficient hydraulic fluid.

The limiting of the brake pressure build-up of the hydraulic brake boosting may comprise the generating of a lower assisting brake pressure on the part of the hydraulic pump in comparison to a state not requiring an electronic brake force distribution. For example, in a first vehicle state that does not require an electronic brake boosting, the brake pressure build-up of the hydraulic brake force distribution may be a function only of a brake force summoned up or requested by the driver of the vehicle. In this case, there may be a linear or some other relationship between the assisting brake pressure generated by the hydraulic brake boosting and the brake force initiated by the driver. There may further be a linear or some other relationship between the brake pressure requested by the driver and the brake force exerted by him. In a second vehicle state that requires an electronic brake force distribution, the generation of the assisting brake pressure supplied by the hydraulic brake boosting may be limited to a value that is lower than a corresponding value of an assisting brake pressure in the first vehicle state. This lower value may correspond to the value that would be generated in the case of an electronic brake force distribution without hydraulic brake boosting.

In the course of the electronic brake force distribution, brake pressures that differ from axle to axle may be adjusted, wherein the limiting of the brake pressure build-up of the hydraulic brake boosting is effected at least at one vehicle rear axle or at a plurality of vehicle rear axles. For example, there may be associated with one or more vehicle rear axles an individual brake circuit, in which the brake pressure build-up, controlled by the electronic brake force distribution, is limited. In particular, in a vehicle having two separate brake circuits a first brake circuit may be associated with a front axle and a second brake circuit with a rear axle of the vehicle and the limiting of the brake pressure build-up may relate only to the second brake circuit.

The detecting of a state requiring an electronic brake force distribution may comprise detecting a wheel slip that differs from axle to axle. A wheel slip may be determined by processing a rotational speed of a wheel and a vehicle velocity. Particularly if at least one rear wheel has a higher wheel slip than a front wheel, it is possible to infer a state requiring an electronic brake force distribution.

The electronic brake force distribution may supply the hydraulic brake boosting with a pressure signal, which below a limit pressure corresponds to a brake pressure in a driver-operable master cylinder. If the limit pressure is reached, then the pressure signal corresponds to the limit pressure. The limit pressure in this case is a brake pressure that guarantees directional stability of the vehicle. In this way, a conventional hydraulic brake boosting may be used according to the invention in interaction with an electronic brake force distribution without requiring any further modifications to the hydraulic brake boosting.

According to a second aspect, a computer program product comprising program code means is provided for performing the previously described method when the computer program product runs on a processing unit (for example a control unit). Such a processing unit may control the functions of the EBD and the HBB. Further braking-related control systems such as ABS and ESP may additionally run on the processing unit.

The computer program product may be stored on a computer-readable data carrier. For example, the computer program product may be stored on a mobile data carrier, such as for example a diskette, a hard disk, a CD or DVD, or on a fixed data carrier, such as for example a semiconductor memory (say, a RAM, ROM, EPROM, EPROM, NOVRAM or FLASH).

According to a third aspect, a vehicle brake system is provided, comprising a hydraulic brake booster that is designed to assist the build-up of a brake pressure requested by a driver as well as an electronic brake force distributor comprising a detector for detecting a state requiring an electronic brake force distribution and a limiter for limiting the brake pressure build-up of the hydraulic brake boosting in accordance with the electronic brake force distribution.

The detector may acquire for example at least one of the following parameters: a laden state, a velocity, an inclination of the vehicle in a longitudinal- or transverse direction, a yaw rate, a wheel slip at a rear axle, a wheel slip at a front axle, a vehicle velocity, a rotational speed of a wheel, and an angle of rotation of a steering wheel of the vehicle.

The hydraulic brake booster may be designed to actuate a hydraulic pump. The hydraulic pump may bring about a positive hydraulic pressure difference between a hydraulic line leading to wheel brakes and a driver-operable master cylinder. In such a situation, the limiter may be realized by means of an electronic actuating device for the hydraulic pump.

The vehicle brake system may comprise a valve that is adapted to be actuated in order to hydraulically separate a high-pressure side of the hydraulic pump from a driver-operable master cylinder. This valve may be electrically controllable.

The vehicle brake system may further comprise a valve that is adapted to be electrically activated in order to hydraulically connect a low-pressure side of the hydraulic pump to a driver-operable master cylinder. If the master cylinder is in turn connected to a hydraulic fluid reservoir, the hydraulic pump may take in hydraulic fluid in this way. Alternatively or in addition thereto, a hydraulic fluid delivered by the hydraulic pump may also come from another source, for example from an accumulator. The control of this valve may likewise be effected electrically.

The hydraulic brake booster may comprise a first control unit and the electronic brake force distributor may comprise a second control unit, wherein between the first control unit and the second control unit an interface may be provided for communicating brake pressure limiting commands from the second control unit to the first control unit. The interface may be for example an electrical interface or a data interface. The limiting commands may be in the form of analogue or digital data or signals.

Alternatively, control modules of the hydraulic brake booster and of the electronic brake force distributor may be different functional modules within a common control unit. In one implementation, each of the functional modules may be a computer program that runs in the control unit.

Other advantages of this invention will become apparent to those skilled in the art from the following detailed description of the preferred embodiments, when read in light of the accompanying drawings.

DETAILED DESCRIPTION OF THE INVENTION

Figure 1:
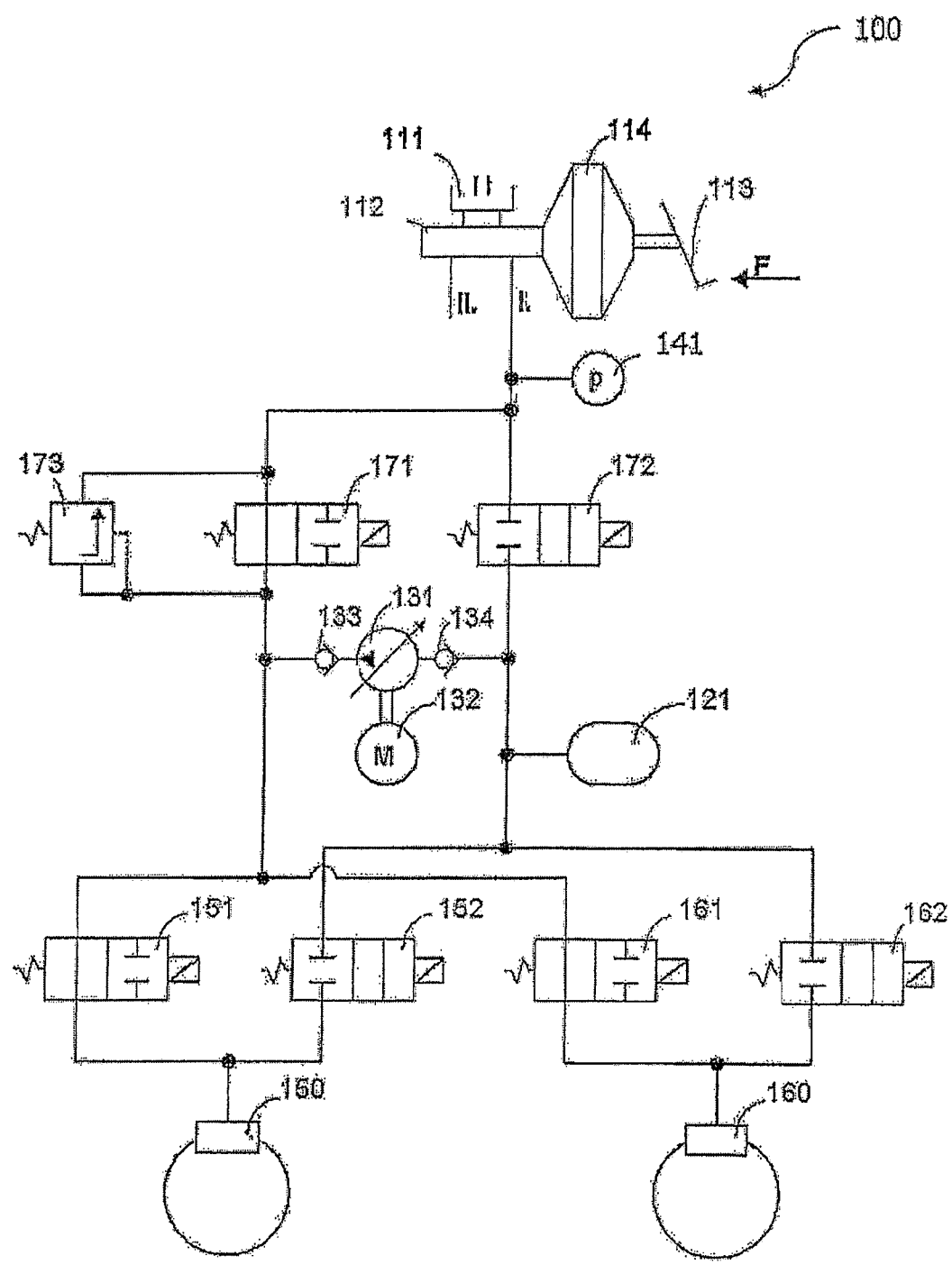
FIG. 1 a schematic representation of a brake system with hydraulic brake boosting.

FIG. 1 shows in a schematic representation a hydraulic brake system 100 according to an embodiment. The brake system 100 operates by means of a hydraulic fluid that is stored in part in a container 111 serving as a reservoir. Brake pressure, which arises by pressurizing the hydraulic fluid, is generated by means of a master cylinder 112 that is to be operated by the driver by means of a pedal 113, wherein the force F initiated by the driver is boosted—for example by means of a vacuum—by a brake booster 114.

From the master cylinder 112 a first brake circuit I. and a second brake circuit II. are supplied, wherein with each brake circuit two wheel brakes are associated. As the brake circuits I. and II. may be substantially identical in construction, here only the first brake circuit I. that supplies two wheel brakes 150 and 160 is represented in detail. Depending on which wheel brakes of the vehicle are supplied by which brake circuit, the result is either a front-/rear axle split (also: "black-and-white split" or "front/rear split brake circuit"), i.e. the one brake circuit supplies the wheel brakes of the front axle and the other brake circuit supplies the wheel brakes of the rear axle, or a diagonal split (also: "diagonal split brake circuit"), i.e. each brake circuit supplies the wheel brake of a front wheel and the wheel brake of the diagonally opposite rear wheel. In the following it is assumed that there is a black-and-white split and that the wheel brakes 150 and 160 act upon wheels of a rear axle of the vehicle.

The hydraulic connection from the master cylinder 112 to the wheel brakes 150 and 160 is determined by electromagnetically actuated 2/2-way valves 151, 152, 161, 162, 171 and 172, which in the inoperative, i.e. electrically non-actuated state occupy the basic positions represented in FIG. 1. Here in particular this means that the valves 151, 161 and 171 each occupy their throughflow position and the valves 152, 162 and 172 each occupy their blocking position.

In order to carry out service or normal braking operations, in the represented basic positions of the valves 151, 152, 161, 162, 171 and 172 there is a direct hydraulic connection between the master cylinder 112 and the wheel brakes 150 and 160. Thus, an operation of the master cylinder 112 gives rise in the wheel brakes 150 and 160 to a brake pressure, the amount of which (initially without regard to a hydraulic brake boosting) depends upon the force F initiated by the driver and upon the gain factor of the brake booster 114. A pressure sensor 141 picks up a pressure prevailing in the master cylinder 112 and may be used to detect the need for an additional hydraulic pressure boost.

The valves 151, 152, 161 and 162 and an accumulator 121 allow the implementation of an antilock control operation (ABS). The ABS functionality at this point is of no further significance, and the person skilled in the art knows how the valves 151, 152, 161 and 162 have to be actuated in order as a function of the driving state to increase, maintain and/or reduce a hydraulic brake pressure acting upon the wheel brakes 150 and 160. In the following consideration of the mode of operation of the brake system 100, it is assumed that an ABS function is not activated and that the valves 151, 152, 161 and 162 occupy the positions shown in FIG. 1.

The brake system 100 further comprises a hydraulic pump 131, for example in the form of a radial piston pump, which is actuable by an electric motor 132. The hydraulic pump 131 is blocking counter to its delivery direction, as is represented by the blocking valve 133 at a high-pressure side of the pump 131 and by the blocking valve 134 at a low-pressure side of the pump 131. The rotational speed of the electric motor 132 is controllable so that the delivery rate of the pump 131 may be adjusted. It is possible for the electric motor 132 simultaneously to actuate a pump of the second brake circuit II., which is not represented in detail here.

As already explained, the brake system 100 allows a hydraulic brake boosting for example in situations, in which the vacuum brake booster 114 has reached its maximum gain. In order to effect the hydraulic brake boosting, the valves 171 and 172 are actuated in such a way that the valve 171 occupies its blocking position and the valve 172 occupies its throughflow position. As a result, on the one hand the output of the pump 131 is hydraulically separated from the master cylinder 112, i.e. a direct hydraulic connection exists only between the output of the pump 131 and the wheel brakes 150 and 160. On the other hand there is a hydraulic connection from the low-pressure side of the pump 131 to the master cylinder 112 and/or the container 111, thereby allowing the pump 131 to take in hydraulic fluid from the container 111 in order to additionally generate brake pressure in the wheel brakes 150 and 160.

Optionally and not as an absolute necessity for a function according to the invention a pressure control valve 173 is connected in parallel to the valve 171. The pressure control valve 173 ensures that the brake pressure generated at the high-pressure side of the pump 131 when the valve 171 is in blocking position does not exceed a predetermined value. In the embodiment represented in FIG. 1 the pressure control valve 173 is designed to limit the brake pressure generated by the pump 131 in the event of a malfunction in order to avoid damage to the brake system 100, for example as a result of overloading.

In a further embodiment, the pressure control valve 173 may be designed to be electrically adjustable to a specific limit pressure. In this case the pressure difference, which is crucial for the pressure-limiting function and at which the pressure control valve 173 automatically transfers into its let-through position, is adjustable by means of the electrical control. As an electrical control, use is made for example of pulse width modulation, the pulse/pause ratio of which is adjustable in such a way that in dependence thereon the pressure difference that is crucial for the pressure-limiting function may be controlled and/or regulated as a function of the pulse width modulation.

In a further non-represented embodiment the valve 171 and the pressure control valve 173 may be combined in a valve arrangement. Such valve arrangements are known as ISO valves. Such a valve arrangement is known for example from DE 4 439 890 C2.

The brake system 100 is moreover capable of bringing about an electronic brake force distribution. For the electronic brake force distribution the pressure control valve 173 may be actuated independently of a drive circuit of the pump 131 in order in the first brake circuit I. to limit a maximum brake pressure acting upon the wheel brakes 150 and 160, and hence a maximum brake force acting upon the wheels connected to the wheel brakes 150 and 160, while in the second brake circuit II. (as yet) no such limitation is effected.

Figure 2:
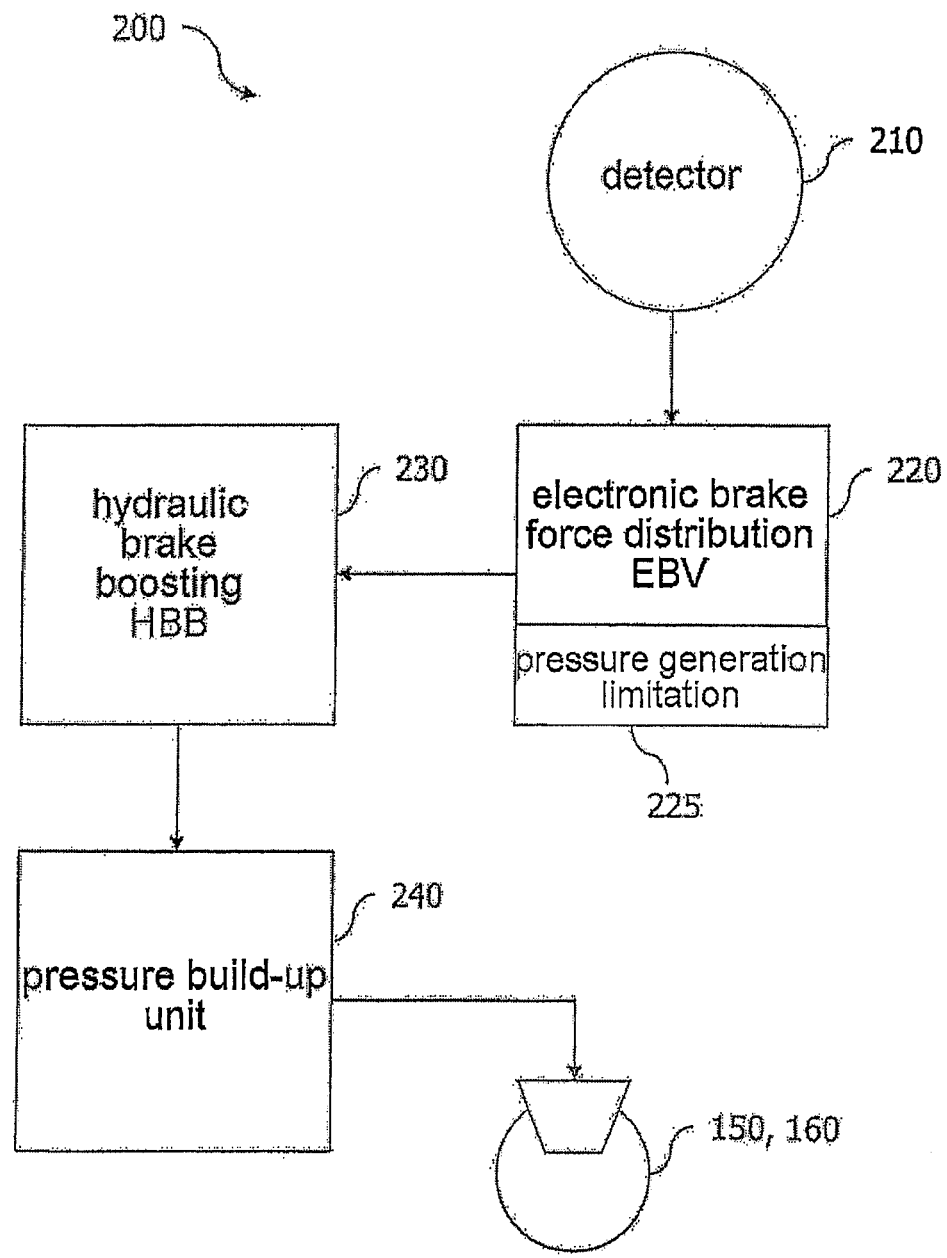
FIG. 2 a functional overview of a brake system with hydraulic brake boosting and electronic brake force distribution.

FIG. 2 shows a functional overview of a brake system 200 with hydraulic brake boosting 220 and electronic brake force distribution 230, like for example the brake system 100 according to FIG. 1. The corresponding functionalities 220, 230 may be implemented in control units or control unit modules.

A detector 210 (for example a suitable sensor) picks up a state of the vehicle, which is decelerated by means of the brake system 200. As already mentioned above, the detector 210 may acquire and process a large number of different measured values, for example a laden state, a velocity, an inclination of the vehicle in a longitudinal- or transverse direction, a yaw rate, a wheel slip at a rear axle, a wheel slip at a front axle, a vehicle velocity, a rotational speed of a wheel, and an angle of rotation of a steering wheel of the vehicle.

The detector 210 is connected to the electronic brake force distribution 220 and supplies it with signals that characterize the state of the vehicle. The electronic brake force distribution 220 determines whether or not the state determined by means of the detector 210 requires a distribution of the brake force, and as a function thereof supplies the hydraulic brake boosting 230 with a signal that indicates a (maximum) brake pressure to be adjusted at a rear axle of the vehicle. This brake pressure that is to be adjusted is determined by the electronic brake force distribution 220 by means of a pressure generation limitation 225.

In a vehicle without EBD the hydraulic brake boosting 230 may be connected, instead of to the electronic brake force distribution 220, to a pressure sensor that picks up a brake pressure in a master cylinder 112. In the illustrated embodiment, the signal that is supplied by the electronic brake force distribution 220 to the hydraulic brake boosting 230 may therefore be a simulation of a pressure sensor signal. In particular, in a state of the vehicle, in which no brake force distribution is required, the signal supplied by the electronic brake force distribution 220 may correspond to an actual brake pressure (determined for example by means of the detector 210). However, in a state of the vehicle, in which a brake force distribution is required, the signal supplied by the electronic brake force distribution 220 may correspond to a brake pressure lower than the actual brake pressure, and in particular the signal may correspond to a limited brake pressure that ensures that the wheel brakes 150, 160 of the rear axle are not actuated to an extent that jeopardizes a directional stability of the vehicle.

An exchange of data and/or commands between the electronic brake force distribution 220 and the hydraulic brake boosting 230 may for example take the form of a data interface. In particular, the electronic brake force distribution 220 and the hydraulic brake boosting 230 may be computer programs that are run on a common processing unit. The data interface may in this case be purely software-based.

The hydraulic brake boosting 230 then in accordance with the signal received from the electronic brake force distribution 220 controls a pressure build-up unit 240, which supplies a brake pressure for one or more wheel brakes 150, 160 of the rear axle of the vehicle. In this case, the brake pressure at the wheel brakes 150, 160 follows the selections of the hydraulic brake boosting 230, which in accordance with the vehicle state follows the selections of the electronic brake force distribution 220.

Figure 3:
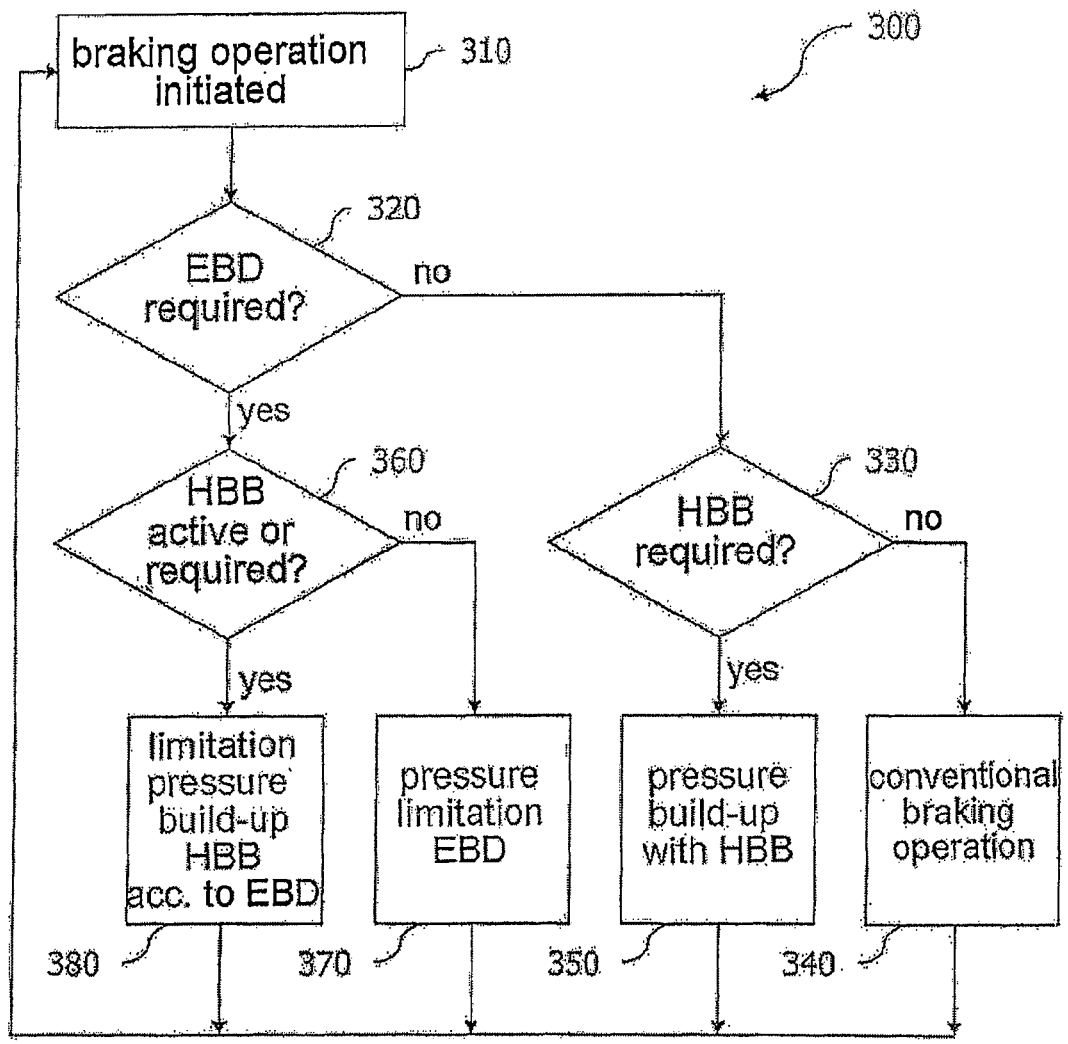
FIG. 3 a schematic flowchart of a method of building up a brake pressure.

FIG. 3 shows a schematic flowchart 300 of a method of building up a brake pressure. The representation of the method 300 is based on a brake system like the brake system 100 shown in FIG. 1. In the following, therefore, reference is made once again to elements of FIG. 1.

In a first step 310 a braking operation is initiated. This may be implemented for example by actuation of a brake pedal by a driver.

In a next step 320 it is determined whether an electronic brake force distribution is required. For this purpose, a driving- and/or vehicle state is acquired for example by sampling and processing measured values of the vehicle. The acquiring of the driving- and/or vehicle state may comprise acquiring a vehicle velocity, a wheel slip at front wheels and/or at rear wheels. The determining whether an EBD functionality is required may comprise comparing one or more parameters with associated threshold values.

If in step 320 it is determined that an electronic brake force distribution is not required, then in a step 330 it is determined whether a hydraulic brake boosting is required. If this second requirement does not exist, then in a step 340 a conventional braking operation occurs, during which neither an HBB- nor an EBD functionality is active. Otherwise, in a step 350 a brake pressure is built up in accordance with the conventional HBB selections.

If on the other hand in step 320 it is established that an electronic brake force distribution is required, then in a next step 360 it is determined whether a hydraulic brake boosting is already active or required. If this is not the case, in a step 370 the brake pressure acting upon the wheel brakes 150, 160 of the rear axle of the vehicle is limited within the framework of the conventional EBD functionality without an HBB functionality being or having been activated. The limiting of the brake pressure is effected for example by corresponding actuation of the valves 171 and/or 172, the pump 131 and/or the electric motor 132 selectively in the first brake circuit I.

If on the other hand in step 360 it is determined that a hydraulic brake boosting is also active or required, then in a next step 380 the brake pressure generated by the HBB functionality is limited to a value in accordance with the selection of the electronic brake force distribution. In this case, as is illustrated in FIG. 2, the HBB functionality is actuated by the EBD functionality in such a way that a higher brake pressure than a required brake pressure is initially not generated at all by the pump 131 or, if a higher brake pressure has already been adjusted, the brake pressure is reduced to the required brake pressure.

The determinations, whether an electronic brake force distribution (step 320) and/or a hydraulic brake boosting (steps 330, 360) is required, may alternatively be carried out in the reverse order or in parallel to one another. After the brake pressure has been adjusted in one of the steps 340, 350, 370 or 380, the method returns to the step 310, from which the described steps may also be executed afresh.

Figure 4:
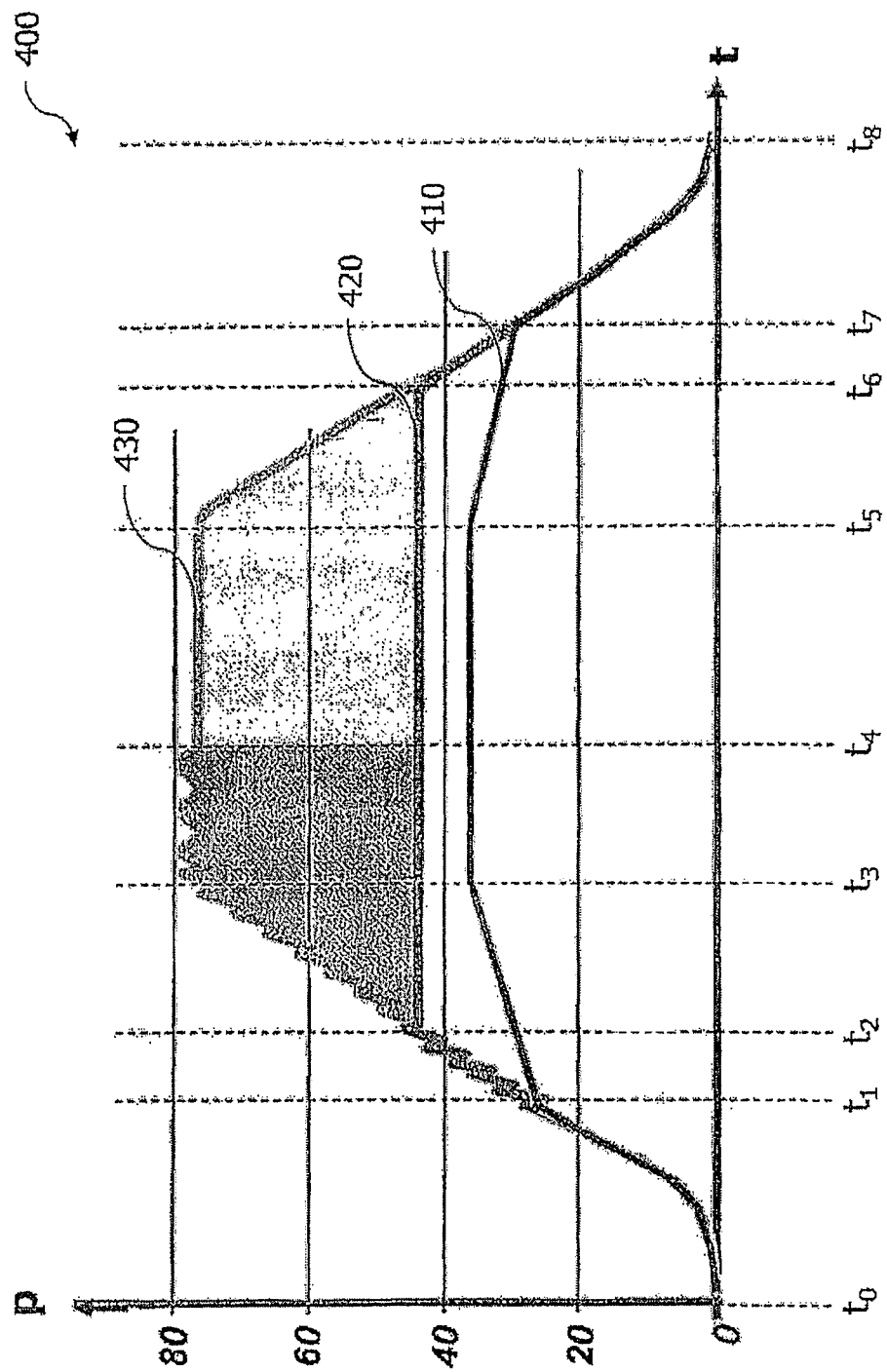
FIG. 4 brake pressure characteristics of wheel brakes at a front- and a rear axle of a vehicle.

FIG. 4 shows a time characteristic 400 of various pressures of a brake system like the brake system 100 represented in FIG. 1. In the following reference is made once again to elements of FIGS. 1 and 2. The basis is a vehicle, the brake system of which has two mutually separate brake circuits, of which one (I.) acts upon two wheel brakes of a front axle and the other (II.) acts upon two wheel brakes 150 and 160 of a rear axle. The brake system of the vehicle further has a conventional, vacuum-controlled brake booster 114. A possibly provided ABS- or ESP functionality is disregarded in the representation in FIG. 4.

The curve 410 describes a hydraulic pressure in the master cylinder 112 of the brake system 100 of the vehicle. The curve 420 describes a brake pressure at the rear wheel brakes 150 and 160, while the curve 430 describes a brake pressure at front wheel brakes of the vehicle. In horizontal direction the time is plotted, in vertical direction a hydraulic pressure in bars.

Between the times $t_0$ and $t_1$ there occurs an actuation of the brake pedal 113 with increasing actuating force by the driver of the vehicle as well as an associated, matching increase of the three pressures 410, 420 and 430.

At the time $t_1$ the brake booster 114 reaches its maximum gain, for example because a vacuum reservoir associated therewith is exhausted. At the same time a hydraulic brake boosting is activated, which actuates the valves 171 and 172 as well as the pump 131 and the electric motor 132. Between the times $t_1$ and $t_2$ the rear wheel brake pressure 420 and the front wheel brake pressure 430 increase substantially identically and linearly. As indicated by the ripple in the characteristics of the brake pressures 410 and 420, a drive pattern of the electric motor 132 and a delivery response of the pump 131 have the effect that both pressure characteristics are slightly pulsating. The pressure 410 in the master cylinder increases more slowly between $t_1$ and $t_2$ than before the time $t_1$. The driver may notice this by feeling a varied resistance at the brake pedal 113 connected to the master cylinder 114.

At the time $t_2$ the pressure 420 at the rear wheel brakes 150 and 160 has reached a value that allows a wheel slip at the rear wheel brakes 150 and 160 to become great enough for there to be only just no danger of the tail of the vehicle swerving to the right or left. In order to avoid reaching an unstable driving- and/or vehicle state as a result of a further increased pressure variation at the rear wheel brakes 150 and 160, at the time $t_2$ an electronic brake force distribution is activated, which limits the brake pressure 420 at the rear wheel brakes 150 and 160. For this purpose, as illustrated in FIGS. 1 and 2, the electronic brake force distribution 220 prompts the hydraulic brake boosting 230 to control the pump 131 and/or the electric motor 132 in such a way that the rear wheel brake pressure 420 remains at the instantaneous value. The front wheel brake pressure 430 is not subject to the electronic brake force distribution 220 and therefore remains dependent only upon the pressure 410 in the master cylinder 112 and is not limited.

Since as a result of the activated electronic brake force distribution 220 it is already known at the time $t_2$ that the rear wheel brake pressure 420 is not to be increased further, as an alternative or in addition to the described pump control the valves 171 and 172 may both be transferred into a blocking state so that the rear wheel brake pressure 420 at the rear wheel brakes 150 and 160 is "blocked in". If the electric motor 132 does not also drive a pump of the other brake circuit (II.), then the electric motor 132 may likewise be stopped. By virtue of these measures, unnecessary wear and annoyance caused by noise, vibration and harshness (NVH) may be reduced.

Between the times $t_2$ and $t_3$ there occurs a further increase of the pressure 410 in the master cylinder as a result of a corresponding actuation by the driver. In dependence upon the rise of the pressure 410 in the master cylinder the front wheel brake pressure 430 also rises, while the rear wheel brake pressure 420 remains constant because of the activated brake force distribution.

At the time $t_3$ the pressure 410 in the master cylinder has reached a maximum value, which means that the driver is actuating the brake pedal with a force F that now remains constant. Between the times $t_3$ and $t_4$, in addition to the rear wheel brake pressure 420 the front wheel brake pressure 430 also remains substantially constant.

At the time $t_4$ two valves in the brake circuit I., which correspond to the valves 171 and 172 in the brake circuit II., are both transferred into a blocking state so that, in the brake circuit I. too, the brake pressure 430 at the front wheel brakes is "blocked in" and the brake pressure 430 in the further characteristic no longer demonstrates the roughness caused by the pump. At this time the pump and/or the actuation of the pump of the brake circuit I. may likewise be deactivated in order to further reduce NVH and prevent unnecessary wear.

Up to the time $t_5$ the pressures 410, 420 and 430 remain constant. Then the driver begins to reduce an actuation of the brake pedal 113, this being reflected in a linearly decreasing pressure 410 in the master cylinder 112. In a corresponding manner, between the times $t_5$ and $t_6$ the front wheel brake pressure 430 is also reduced. The rear wheel brake pressure 420 however continues to be held constant at its limit value.

At the time $t_6$ the front wheel brake pressure 430 drops below the limit value selected for the rear wheel brake pressure 420. Between the times $t_6$ and $t_7$ a further reduction of the pressure 410 in the master cylinder occurs. Thus, the rear wheel brake pressure 420 follows the front wheel brake pressure 430 and decreases linearly in proportion to the pressure 410 in the master cylinder. Between the times $t_7$ and $t_8$ the hydraulic brake boosting is deactivated and a residual functionality of the conventional brake booster 114 is utilized. The pressure 410 in the master cylinder in this section corresponds once more to the rear wheel brake pressure 420 and the front wheel brake pressure 430. At the time $t_8$ the pressures 410, 420 and 430 reach the value zero.

The person skilled in the art understands that the embodiment described with reference to FIGS. 1 to 4 may be modified, supplemented and adapted in many ways. Thus, the invention may be implemented for example also in an electrohydraulic brake system.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A method of effecting electronic brake force distribution in a vehicle brake system, comprising the steps:
  (a) providing a vehicle brake system equipped with hydraulic brake boosting with the hydraulic brake boosting designed to assist the build-up of a brake pressure requested by a driver with the hydraulic brake boosting including electrical actuation of a hydraulic pump that is integrated into the vehicle brake system and electrical actuation of a valve that one of hydraulically separates a high-pressure side of the hydraulic pump from a driver-actuable master cylinder and hydraulically connects a low-pressure side of the hydraulic pump to a driver-operable master cylinder;
- (b) detecting a state requiring an electronic brake force distribution; and
- (c) limiting the brake pressure generation of the hydraulic brake boosting in accordance with the electronic brake force distribution.

2. The method according to claim 1, wherein the electrical actuation of the hydraulic pump for the hydraulic brake boosting is effected upon one of attainment and immediately impending attainment of a maximum gain of a vacuum or pneumatic brake booster that is integrated into the vehicle brake system.

3. The method according to claim 1, wherein the limiting of the brake pressure generation of the hydraulic brake boosting includes the generating of a lower assisting brake pressure on the part of the hydraulic pump in comparison to a state not requiring an electronic brake force distribution.

4. The method according to claim 1 wherein in the course of the electronic brake force distribution brake pressures that differ from axle to axle are adjusted and further wherein the limiting of the brake pressure build-up of the hydraulic brake boosting is effected at least at one vehicle rear axle or at a plurality of vehicle rear axles.

5. The method according to claim 1 wherein the detecting of a vehicle state requiring an electronic brake force distribution includes detecting a wheel slip that differs from axle to axle.

6. The method according to claim 1 wherein the electronic brake force distribution supplies the hydraulic brake boosting with a pressure signal that, upon being below a limit pressure, corresponds to a brake pressure in a driver-operable master cylinder.

7. A system for effecting electronic brake force distribution in a vehicle brake system comprising:
- a vehicle brake system equipped with hydraulic brake boosting with the hydraulic brake boosting designed to assist the build-up of a brake pressure requested by a driver with the hydraulic brake boosting including a hydraulic pump and a valve that are adapted to be electrically actuated in order to one of hydraulically separate a high-pressure side of the hydraulic pump from a driver-operable master cylinder and hydraulically connect a low-pressure side of the hydraulic pump to a driver-operable master cylinder;
- a processing unit for controlling the vehicle brake system: and
- a program code for the processor for detecting a state requiring an electronic brake force distribution and causing the vehicle brake system to limit the brake pressure generation of the hydraulic brake boosting in accordance with the electronic brake force distribution.

8. The system according to claim 7 wherein the program code is stored on a computer-readable data carrier.

9. A vehicle brake system, comprising:
- a hydraulic brake booster that is designed to assist the build-up of a brake pressure requested by a driver; and
- an electronic brake force distributor that includes:
  - a detector for detecting a state requiring an electronic brake force distribution;
  - a limiter for limiting the brake pressure generation of the hydraulic brake boosting in accordance with an electronic brake force distribution; and
  - a hydraulic pump and a valve that are adapted to be electrically actuated in order to one of hydraulically separate a high-pressure side of the hydraulic pump from a driver-operable master cylinder and hydraulically connect a low-pressure side of the hydraulic pump to a driver-operable master cylinder.

10. The vehicle brake system according to claim 9, wherein the hydraulic brake booster is designed to actuate the hydraulic pump.

11. The vehicle brake system according to claim 9, wherein the hydraulic brake booster also includes a first control unit with the electronic brake force distributor being a second control unit and further wherein between the first control unit and the second control unit an interface is provided for communicating brake pressure limiting commands from the second control unit to the first control unit.

12. The vehicle brake system according to claim 9, wherein a control module of the hydraulic brake booster and a control module of the electronic brake force distributor are different functional modules within a common control unit.

* * * * *